(12) United States Patent
Chawla et al.

(10) Patent No.: US 10,491,622 B2
(45) Date of Patent: Nov. 26, 2019

(54) AUTOMATIC WEBPAGE CHANGE DETECTION

(71) Applicant: SYNACK, INC., Redwood City, CA (US)

(72) Inventors: Kirti Chawla, Redwood City, CA (US); Viktor Toth, Redwood City, CA (US); Mikhail Sosonkin, Washington, DC (US); Mark G. Kuhr, Redwood City, CA (US)

(73) Assignee: SYNACK, INC., Redwood City, CA (US)

( * ) Notice: Subject to any disclaimer, the term of this patent is extended or adjusted under 35 U.S.C. 154(b) by 369 days.

(21) Appl. No.: 15/398,557

(22) Filed: Jan. 4, 2017

(65) Prior Publication Data

US 2018/0191764 A1    Jul. 5, 2018

(51) Int. Cl.
*H04L 29/06* (2006.01)
*G06F 16/951* (2019.01)

(52) U.S. Cl.
CPC ........ *H04L 63/1433* (2013.01); *G06F 16/951* (2019.01); *H04L 63/12* (2013.01); *H04L 63/1441* (2013.01)

(58) Field of Classification Search
CPC .............. H04L 63/1433; H04L 63/12; H04L 63/1441; G06F 16/951
See application file for complete search history.

(56) References Cited

U.S. PATENT DOCUMENTS 6,119,124 A * 9/2000 Broder .................. G06F 16/355
7,310,632 B2 * 12/2007 Meek .................... G06F 16/951
                                                              707/709

(Continued)

OTHER PUBLICATIONS

Charles Reis, et al., *Detecting In-Flight Page Changes with Web Tripwires*, University of Washington: Computer Science and Engineering, https://www.cs.washington.edu/research/security/web-tripwire.html (last visited Mar. 7, 2016), 4 pages.

(Continued)

*Primary Examiner* — Huan V Doan
(74) *Attorney, Agent, or Firm* — Hickman Palermo Becker Bingham LLP (57) ABSTRACT

An improved web crawler, associated method of crawling the Internet, and automatically detection of crawled webpage changes are provided. The method comprises obtaining a first version and a second version of the webpage; generating a first simhash of the first version of the webpage and a second simhash of the second version of the webpage; calculating, using a similarity hashing function having small output perturbations for small input perturbations, a probability that there are no differences between the first version of the webpage and the second version of the webpage; providing, to one or more researcher computers, the first version of the webpage and the second version of the webpage; based on input identifying a change in the webpage, updating a count of changes associated with the webpage; providing information about the change in the webpage in the second version of the webpage relative to the first version of the webpage as feedback to the crawler.

28 Claims, 6 Drawing Sheets

(56) References Cited

U.S. PATENT DOCUMENTS

| | | | | |
|---|---|---|---|---|
| 8,990,945 | B1* | 3/2015 | Ranadive | H04L 63/1433 |
| | | | | 713/187 |
| 9,386,037 | B1* | 7/2016 | Hunt | H04L 63/1483 |
| 9,582,596 | B2* | 2/2017 | Amsterdam | G06F 17/211 |
| 2004/0054967 | A1* | 3/2004 | Brandenberger | G06F 16/958 |
| | | | | 715/255 |
| 2005/0071766 | A1* | 3/2005 | Brill | G06F 16/951 |
| | | | | 715/738 |
| 2009/0327914 | A1* | 12/2009 | Adar | G06F 16/958 |
| | | | | 715/745 |
| 2013/0097702 | A1* | 4/2013 | Alhamed | G06F 21/64 |
| | | | | 726/22 |
| 2014/0359411 | A1* | 12/2014 | Botta | G06F 17/2288 |
| | | | | 715/205 |
| 2014/0359760 | A1* | 12/2014 | Gupta | H04L 63/1408 |
| | | | | 726/22 |
| 2017/0262545 | A1* | 9/2017 | Qu | G06F 16/955 |

OTHER PUBLICATIONS

ChangeDetection.com: Automatic website change logs and notification, Home Page, https://www.changedetection.com (last visited Mar. 7, 2016), 2 pages.

Carrie Grimes, et al., Estimation of Web Page Change Rates, Google Research (May 5, 2008), https://static.googleusercontent.com/media/research.google.com/en//pubs/archive/34428.pdf, 6 pages.

About us: the easiest website change detector app, VisualPing.io, https://visualping.io (last visited Mar. 7, 2016), 1 page.

* cited by examiner

COVERAGE

FILTER BY: ~402

404 { | 1 MONTH | 3 MONTH | 6 MONTH | MAX |

| 406 | 408 | 410 | 412 | 414 |
|---|---|---|---|---|
| 96% RESEARCHER TESTED 958/998 URLs | ATTACK ATTEMPTS 8.5K | VULNERABILITIES 24 | RESEARCHERS 129 | 36 SCANS LAST SCAN 13:24 UTC |

| DOMAIN/PATHS | 416 | RESERCHER TESTED URLS | ATTACK ATTEMPTS | VULNS 422 |
|---|---|---|---|---|
| EXAMPLEWEBSITEONE.COM | △56 | 596/612 (97%) | 2.8K | 8 |
| EXAMPLEWEBSITETWO.COM | △10 | 117/122 (96%) | 4.2K | 12 |
| EXAMPLEWEBSITETHREE.COM | △12 | 73/78 (94%) | 345K | 1 |
| EXAMPLEWEBSITEFOUR.COM | △10 | 172/186 (92%) | 1.2K | 3 |

COVERAGE

FILTER BY: 402

404 { 1 MONTH | 3 MONTH | 6 MONTH | MAX }

| 96% 406 RESEARCHER TESTED 958/98 URLs | 408 ATTACK ATTEMPTS 8.5K | 410 VULNERABILITIES 24 | 412 RESEARCHERS 129 | 414 36 SCANS LAST SCAN 13:24 UTC |
|---|---|---|---|---|

| WEBPAGES IN DOMAIN | 502 RESERCHER TESTED URLS | ATTACK ATTEMPTS | VULNS 508 |
|---|---|---|---|
| ADMIN.EXAMPLEWEBSITEONE.COM/HOME | 1/1 (100%) | 102 | 0 |
| ADMIN.EXAMPLEWEBSITEONE.COM/LOGIN | 1/1 (100%) | 156 | 1 |
| ADMIN.EXAMPLEWEBSITEONE.COM/MEMBER | 1/1 (100%) | 988 | 2 |
| ADMIN.EXAMPLEWEBSITEONE.COM/SITEADMIN | 1/1 (100%) | 110 | 0 |

AUTOMATIC WEBPAGE CHANGE DETECTION

FIELD OF THE DISCLOSURE

The technical field of the present disclosure is computer security technology and, more specifically, to computers using a web crawler.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The web, including the Internet, is a complex event-driven platform with numerous applications, technologies, protocols, and use-cases available to address a variety of real world problems. On the web, a set of HTML code that a browser can render ("webpage") may be a functional unit of content. The webpage usually contains a link to another webpage. The webpage may comprise various elements, including hypertext, images, and videos. The webpage may be part of a web application that comprises more than one webpage in one or more sequences. The web application may comprise, for example, an online banking web application. The online banking web application may include static or dynamically generated sequences of webpages for logging in to an account, viewing an account, paying bills electronically, depositing money, managing an account, and performing other tasks.

A web crawler is software that is programmed to retrieve webpages, including webpages in web applications, and to follow each link in a retrieved webpage to reach other webpages. A crawler, when given a set of Uniform Resource Locators (URLs), referred to as "seed URLs", retrieves each webpage and, using hyperlinks included in the webpage, retrieves the linked webpages. For each webpage that is retrieved, the crawler parses or scans the HTML source code of the webpage and records data. The crawler may record data about the webpage, record data about the visit such as a timestamp, and/or may save a copy of the webpage itself. Without intervention, the crawler will continue to crawl to further linked pages until instructed to stop.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In web applications, a variety of programming and application frameworks define how webpage-to-webpage flow behaves for various end-user actions and what data the webpage encapsulates. A web application is typically evaluated for security vulnerabilities such as cross-site scripting vulnerabilities, fuzzing, and other vulnerabilities that can be exploited by malicious parties. A host of a webpage may change the webpage anytime for various reasons, including, for example, to change content, to remediate security vulnerabilities, and to update user interface elements. The changes may introduce vulnerabilities to the previously-secure webpage. Often, the programming and application frameworks are subverted, leading to unintended outcomes for certain end-user actions. This modified webpage behavior is the result of introducing new or exploiting existing functionalities. The exploitation of such webpage functionalities leads to vulnerabilities, which come in a variety of forms such as SQL injections, remote code executions, cross-site scripting attacks, and more. Incidentally, all such unintended outcomes can be inferred by detecting the portion of webpage code that may have been temporally mutated. However, the change to the webpage may not trigger a new evaluation for security vulnerabilities.

An improved web crawler as further described herein is programmed to periodically crawl the webpage to capture a current version of a webpage. The crawler detects such changes in the pertinent portion of code for the purpose of identifying the loci of vulnerabilities. The crawler relies on similarity hashing that isolates meaningful changes within the target code of the changed webpage in order to determine the nature of potential vulnerabilities. The crawler locates, quantifies, and reduces the impact of newly introduced vulnerabilities to ensure tamper-evident webpages. A webpage is construed to have the meaningful changes if compared to its previous version, the manifested current changes exceeds the varying threshold of bit differences (e.g. at least 6-bit worth of differences) as measured by the similarity hashing (or "simhash") algorithm. Such differences may include changes to DOM structure, embedded and external JavaScript code, forms fields, and select resources of audio-visual variety.

Webpages within a web application may be structured to provide programmatic user input such as form fields, which can be defined as a web application. Defining what constitutes a meaningful web application change is context-sensitive. By carefully selecting use-cases, prudently using crawling infrastructure, and applying algorithmic approaches to detecting web application changes, a web crawler may be used to detect targeted scenarios. The crawler that performs change detection receives, as input, the source code of two different versions of a web application to determine the existence and nature of changes. A change detection system within a crawler includes a pluggable dynamically loadable metric architecture and comprises several sub-systems that detect and identify source code changes over the comparable web applications. Precipitating such changes helps converge security researchers' efforts in discovering potentially new vulnerabilities, and help selects suitably matching security researchers who remediate identified vulnerabilities.

Because some webpages change more frequently than others, a periodic crawl at a regular interval may be inappropriate as some webpages will be crawled more often than necessary and other pages will not be crawled frequently enough to capture all versions of the webpage. When a webpage is not crawled frequently enough, there is a significant delay in detecting any newly introduced security vulnerabilities. The following disclosure describes a web crawler that alters the webpage-focused crawl frequency based on the detected changes to the targeted webpage.

To improve the crawler, when a webpage is crawled, the webpage that is captured is compared to an instance of the webpage that was previously captured. When there is a change to the webpage, the previously captured version, the first version, is compared to the current version, the second version. The crawler detects the differences in the webpage versions and determines whether the change is likely to introduce a security vulnerability. Based on the determinations, the crawler obtains feedback that is used to alter the time interval at which the crawler will next crawl the webpage. If the determination is that the change to the webpage has introduced security vulnerabilities, the crawler will next crawl the webpage at a shorter interval. If the determination is that the change has not introduced security vulnerabilities or that no change was detected, the crawler will next crawl the webpage at a longer interval.

Figure 1:
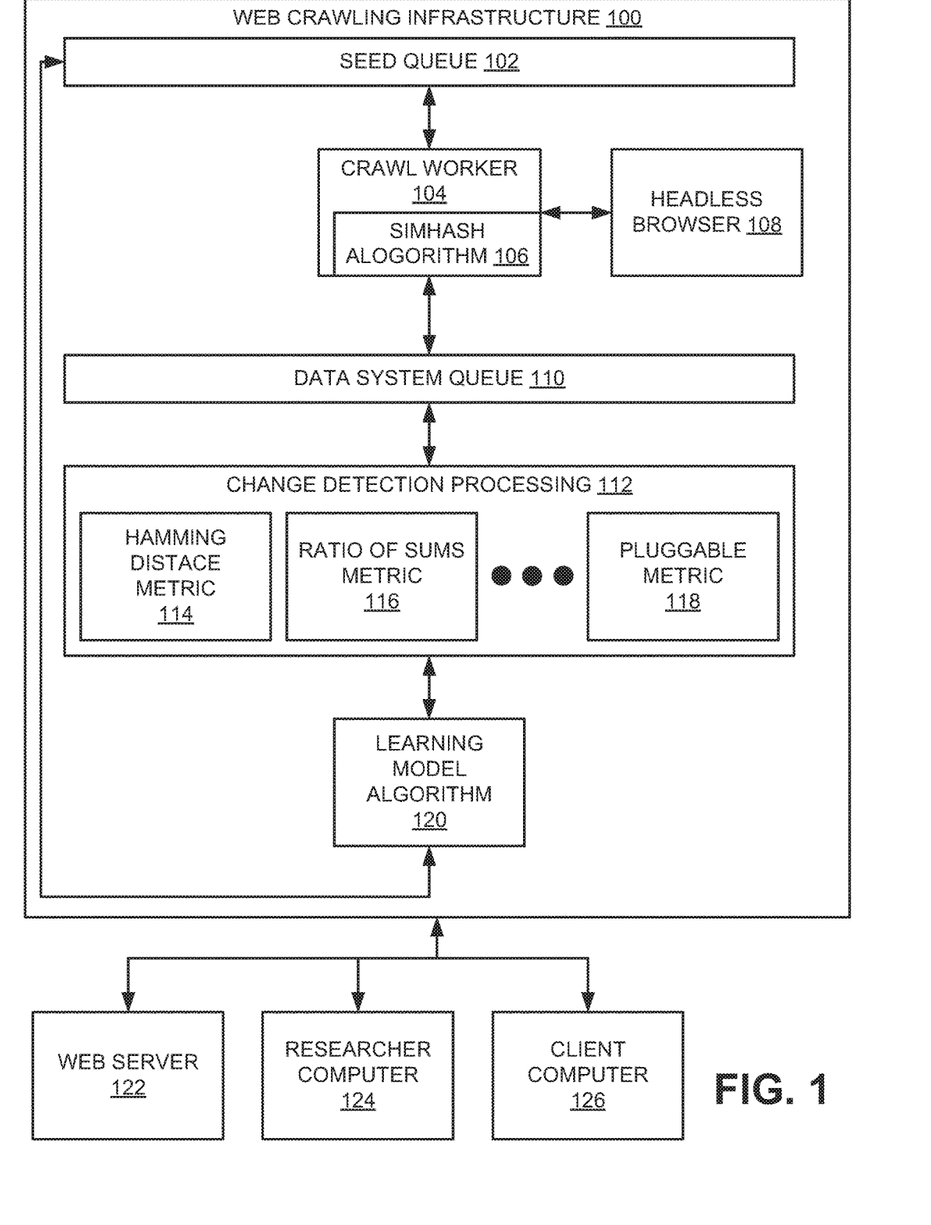
FIG. 1 is a block diagram of a computer-implemented web crawling infrastructure for crawling webpages on the Internet, according to various embodiments.

The description of the web crawler is divided into the following sections:
1.0 CRAWLER INFRASTRUCTURE
2.0 PROCESS FOR MODIFICATION OF CRAWLER
    2.1 SIMHASH
    2.2 DETECTING CHANGES
    2.3 EVALUATING CHANGES
3.0 USER INTERFACES FOR PRESENTING CHANGE DATA
4.0 HARDWARE OVERVIEW 1.0 Crawler Infrastructure FIG. 1 is a block diagram of a web crawling infrastructure 100 for crawling webpages on the Internet, according to various embodiments. The web crawling infrastructure 100 is implemented using one or more computers and includes a web crawler which, unlike conventional crawlers, is programmed to detect changes in a webpage since the webpage was last crawled, to locate those changes in the webpage or source code of the webpage, and to determine if those changes introduce, or are likely to introduce, a security vulnerability. The web crawling infrastructure 100 can be operated by, for example, an online security provider who provides online security services to entities that host web applications. The online security provider may use the crawler to automatically, without human intervention, identify security vulnerabilities in web applications resulting from changes to the web applications.

The web crawling infrastructure 100 comprises a seed queue 102. The seed queue 102 is a queue storing one or more URLs that are to be crawled by a crawl worker 104. The one or more URLs are hosted by one or more web servers 122 such that, when the crawl worker 104 navigates to the URL, the corresponding web server 122 provides HTML code that, when rendered, generates a webpage. The crawl worker 104 is a set of program instructions that, when executed, performs a crawl. The seed queue may include URLs of domains and/or webpages within a domain. In one implementation of the seed queue 102, the crawl worker 104 wraps each URL in a metadata object called a scan. The scan contains the URL to crawl, as well as various metadata such as the HTTP Request Headers. A scan for each URL is added to the seed queue 102. A continuously-running crawl worker 104 fetches scans from the seed queue 102.

For each scan fetched from queue, the crawl processes spawns an instance of a headless browser 108, such as a PhantomJS process. The spawned PhantomJS process makes a request to the scan URL, receives the HTML response, and renders the webpage associated with the URL in memory as a browser would, but not to a display device. By using a headless browser, the crawl worker 104 may load dynamic aspects of the webpage in memory for further evaluation or crawling.

Consequently, the rendered webpage HTML is parsed to generate several different similarity hashes. A similarity hash value ("simhash") generating algorithm 106 executed by the crawl worker 104 generates similarity hashes from different data types, including but not limited to: 1) raw HTML, 2) only the HTML Document Object Model (DOM) elements with element attributes and their values modeled as tree data structure, 3) aggregate of HTML element "style" attribute values, 4) an aggregate of text content wrapped in "<script>" tags, 5) each value held by HTML element "data" attributes, and 6) forms comprising an aggregate of text content wrapped in "<form>" tags. Other example aspects of a webpage from which a similarity hash can be generated include, for example, embedded JavaScript source code and external JavaScript source code. Each of the similarity hashes, along with the corresponding input string that generated the simhash using the simhash algorithm 106, is wrapped up in a JSON message. This JSON message is then pushed into a data system queue 110.

Change detection processing 112 consumes the JSON messages from the data system queue 110 and formats it for consumption by one or more metrics used to compare the similarity hashes to similarity hashes generated from a previous version of the webpage. This formatting includes, but is not limited to, attaching additional metadata such as timestamps, and dividing large messages into smaller messages. The crawling and metadata gathering is performed periodically for each URL. By doing so, change detection processing 112 constructs webpages and data about the webpage across time. Using the data gathered over time, the change detection processing 112 detects webpage changes.

Change detection processing 112 comprises one or more pluggable modules that execute metrics used to detect changes over different versions of a web application. Some of the pluggable modules may identify a type of potential vulnerability, a location of the change on the webpage, a location of a change in a DOM, modeled as tree data structure, or other element of the webpage, or some other value corresponding to a change in the webpage. Example metrics include hamming distance metric 114 and ratio of sums metric 116, described in greater detail in connection with operation 206 of FIG. 2. The change detection system 112 may include additional pluggable metrics 118, which in addition to existing metrics can be selectively plugged in to create an optimal combination of metrics in a hierarchical manner. Consequently, the simhash algorithm, for a given input (e.g. comparable data types of the type DOM, HTML tags, embedded and external Javascript, forms, etc.) can utilize this optimal combination of pluggable metrics to derive, in a piecewise manner from each metric, a sequence of change threshold results which may be combined (e.g. by computing majority voting through interval-based mode operation) together to arrive at the final change threshold result.

Change detection processing 112 is deployable, whether the hashing algorithm or simhash is used in a general sense or use-case specific plugins. To overcome this problem, use-case specific plugins that target data types such as HTML tags, image, JavaScript, CSS, and DOM structures. Additionally, the simhash algorithm 106 and aforementioned metrics may form a symbiotic albeit decouple-able relationship. The decoupling aforementioned metrics from the simhash algorithm 106 enables construction of a variety of different content specific metrics. This approach not only provides future extensibility but also ensures that the overall change detection system sustains or improves robustness in detecting changes across the different inputs. Towards this end, change detection processing 112 is a pluggable and dynamically loadable metric architecture.

The metrics, including hamming distance metric 114 and ratio of sums metric 116, are moved out of the change detection processing 112 and laid-out separately as individual metrics that can be plugged through a generic interface and be dynamically loaded. When two versions of a web application are provided as inputs to change detection processing 112, it invokes a pluggable interface to identify the data type, e.g., HTML tags, image, JavaScript, CSS, or DOM structures. This interface subsequently invokes the relevant metrics to determine similarity between the two versions of the web application. The following code-snippet describes the exposed interface used by change detection processing 112 to invoke the metrics upon input comparison. An example pluggable metric based on the hamming distance metric 114 is also shown alongside.

| Pluggable Module Metric Interface | Example: Hamming Distance Metric |
|---|---|
| 00 def genMetric(hashValue1, hashValue2): | 00 def genMetric(hashValue1, hashValue2): |
| 01 | 01 |
| 02   // metric specific logic | 02   countBits = 0 |
| 03   . . . | 03   xorHash = (hashValue1 ^ hashValue2) |
| 04 | 04   while xorHash: |
| 05   // return the metric value | 05     xorHash &= (xorHash − 1) |
| 06   . . . | 06     countBits+= 1 |
| 07 | 07   return (countBits) |

The pluggable interface implements the genMetric (hashValue1, hashValue2) method as a separate source-code artifact, described in connection with operation 206 of FIG. 2. The simhash algorithm 106, with pertinent changes to incorporate the newly introduced metric, then calls this new metric over the provided inputs to help determine their similarity. The simhash algorithm 106 may require changes every time a new metric is introduced, is new metrics are added relatively infrequently. The simhash algorithm may include automatic registration of metrics to accommodate the pluggable interface if metrics are added or removed more frequently.

Post identification of change, learning model algorithm 120 may generate actionable intelligence for the web crawling infrastructure 100. One such actionable intelligence is to marshal the requisite number and type of security researcher computers 124 associated with human researchers who may classify the identified change as a vulnerability type that affects the given web application. A plurality of such computers can be provided and communicate with the service that implements the crawler. Once the change has been identified, a security researcher computer selection and provisioning algorithm may be invoked to select a programmable number of suitably matching security researchers with relevant skills to help classify the identified changes. Using knowledge of the security researchers' skill-sets, number and quality of their most recent vulnerability submissions, and other related key metrics the selection and provisioning algorithm to select and provision the required security researcher computers 124.

A learning model algorithm 120 receives inputs that may be used to affect the crawl scope of the web crawling infrastructure 100. The crawl scope includes URLs to crawl and URLs to scan for vulnerabilities. The crawl rate includes when to begin a next crawl and when to process scans obtained by crawl worker 104 by change detection processing 112. The learning model algorithm 120 tracks, manages, and enforces variable change thresholds per website using a feedback mechanism. The feedback mechanism records the input from security researchers about the change, and uses the input to control the per website variable change threshold value. The feedback mechanism is discussed herein in connection with FIG. 3.

Another key actionable intelligence post change identification is to affect the crawling infrastructure's scope and rate. In particular, if repeated crawling of the given web application yields source code that has little to no change from the previous crawls then it makes sense to reduce the scope and/or rate of crawling activity in the given sub-branch of the web application. This action enables a more efficient form of crawling wherein only those portions of web applications are traversed that have demonstrably been witnessing meaningful change over time. In fact, embedding the change detection phase within the crawling mechanism enables bounding of the crawling activity's scope and rate in the most natural manner. In particular, web crawling infrastructure 100 defines the crawling behavior to allow for custom crawl specifications with programmable crawl scope and rate, which may be altered on select changes.

To more accurately detect changes, the web crawling infrastructure 100 uses variable change thresholds to determine whether webpages have changed sufficiently to modify the crawling behavior of the web crawling infrastructure 100. For example, assume that a hypothetical website A is mostly a static site; website A changes a webpage but keeps 95% of the HTML. Further assume that another hypothetical website B serves advertisements and the ads, as well as the ad display locations, constantly change. Website B only maintains 80% of the HTML every time the crawl worker 104 visits the webpage. For web site A, a next crawl is warranted if a webpage changes by 5%. Conversely, website B changes would not be sufficient to warrant a next crawl unless at least 20% changes. Hence, the web crawling infrastructure 100 evaluates different websites—and even different parts of the same website—with different variable change thresholds. That way, the web crawling infrastructure 100 may improve the quality of changes that are reported.

The learning model algorithm 120 may provide information about detected changes to a client computer 126. The client computer 126 may assemble the data into a dashboard user interface. The dashboard user interface may include a list of domains or URLs visited by crawl worker 104, a number of changes detected, and a number of security vulnerabilities or attacks identified.

2.0 Process for Modification of Crawler

Figure 2:
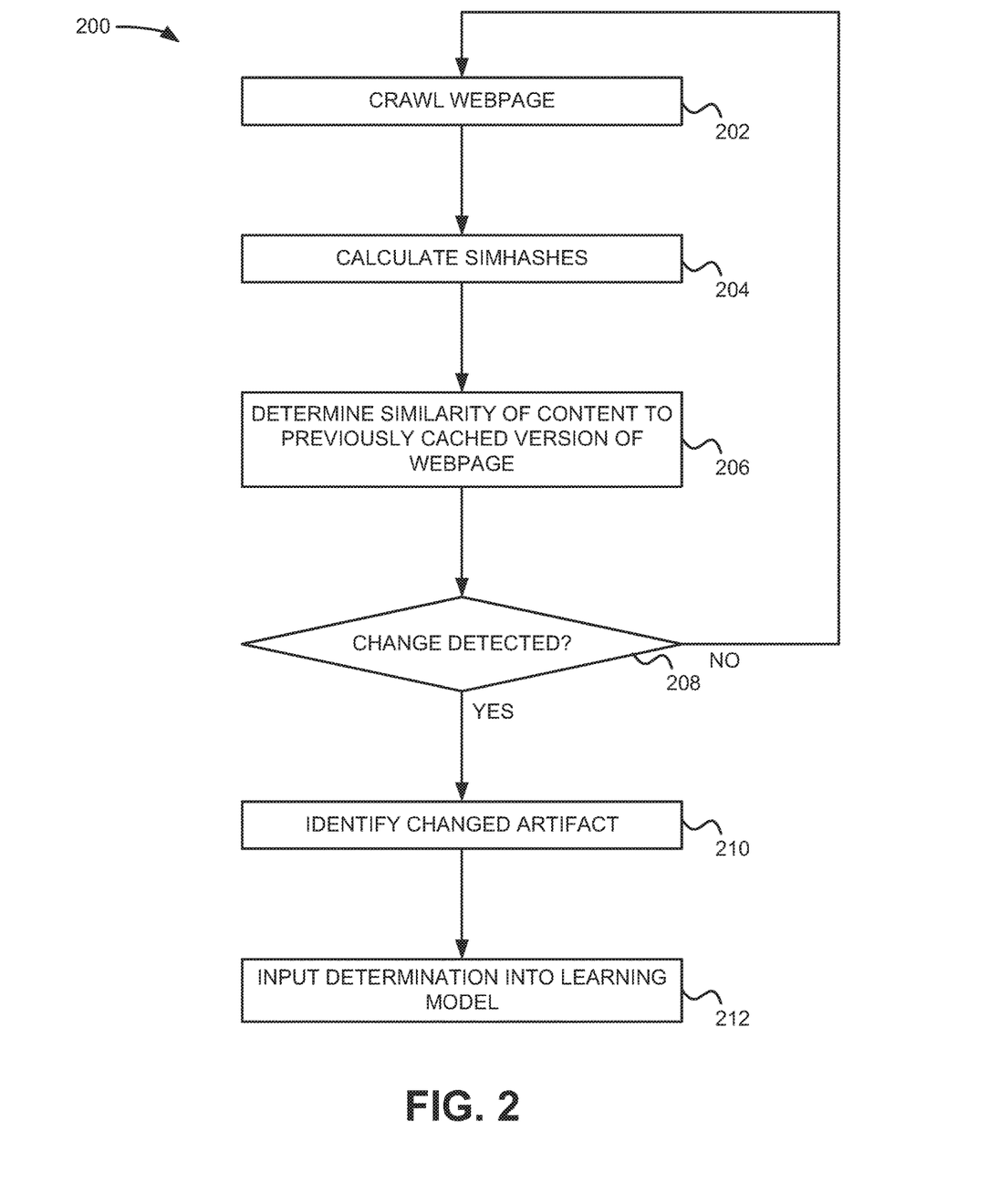
FIG. 2 is a flowchart of a process for detecting changes in webpages and for modifying crawling behavior, according to various embodiments.

FIG. 2 is a flowchart of a process for detecting changes in webpages and for modifying crawling behavior, according to various embodiments. FIG. 2, and each other flow diagram in this disclosure, represents an algorithm that can serve as the basis of writing computer programs to implement the functions of the drawing figures when the programs are executed using a computer. FIG. 2, and each other flow diagram in this disclosure, is expressed at the level of detail that is customary, for persons of skill in the art to which this disclosure pertains, to communicate among themselves about algorithms, plans, specifications and other basis for coding programs that can implement the functions that are shown when executed using a computer.

In an embodiment, a programmed process 200 is a crawling process that includes detection of changes of webpages relative to an earlier, stored version of the same webpage. The process 200 comprises additional operations that are not performed as part of a typical crawling process to calculate simhashes (i.e. hash output of the simhash algorithm) of the webpages captured by the crawl worker 104 and to identify the changes over different versions of the same webpages. From the changes, the crawling process 200 provides feedback to a learning model that is used to modify future crawls to the URLs.

In an operation 202, the crawl worker 104 obtains a URL or scan from the seed queue 102. The crawl worker crawls the webpage corresponding to the URL or scan and renders the webpage in the headless browser 108. As described in connection with crawl worker 104 and headless browser 108, the crawl worker 104 obtains a copy of the webpage, including any dynamic aspects of the webpage.

2.1 Simhash

In an operation 204, the crawl worker 104 calculates at least one similarity hash value of the webpage. Such a simhash is a hash value that represents at least one aspect of the crawled webpage by calculating the hash over that aspect of the webpage. Simhashes can be generated from different data types, for example, the webpage as a whole, from HTML DOM elements with element attributes and their values that are modeled as tree data structure, from the aggregate of HTML element "style" attribute values, from the aggregate of text content wrapped in "<script>" tags, from each value held by HTML element "data" attributes, and from the aggregate of text content wrapped in "<form>" tags. Each simhash may be 128 bits or more. Using fewer than 128 bits in a simhash may result in similarity hashes that are insufficient to detect minor changes between versions of a web application, resulting in a higher rate of false negatives. Simhashes can be calculated using the following implementation of the algorithmic description.

A simhash, referred to in this implementation as genSimHash( ), calculates similarity hash values for a list of input tokens derived from the web application. In particular, the simhash initializes an internal state vector of size HASH_BIT_SIZE of at least 128 bits to zero, read a list of input tokens derived from the web application, generate built-in hash, by invoking genDefHash( ), on per token basis, generate a bit-position sensitive mask, and keep track of whether at a certain position, I, in the hashed-token bit-string is set or not through the pre-initialized internal state vector. Finally, a fingerprint is generated by sum of product over the internal vector locations which are set. Example code for genSimHash( ) is as follows:

```
1.0.    InternalVector = [0]_HASH_BIT_SIZE
2.0.    for each token T in the list of input tokens:
2.1.       TransformedToken = genDefaultHash(T))
2.2.       BitMask = 0
2.3.       for each index 1 in range(0, HASH_BIT_SIZE):
2.4.          BitMask = (1 << 1)
2.5.          if (TransformedToken & BitMask):
2.5.1..          IntervalVector[I] += 1
2.6.          else:
2.6.1..          IntervalVector[I] -= 1
2.7.    FingerPoint = 0
2.8.    for each index 1 in range(0, HASH_BIT_SIZE):
2.9.       if (InternalVector[I] >= 0):
3.0.          FingerPrint += (1 << I)
3.1.    return (FingerPrint)
```

A built-in hash, genDefHash( ) generates default hash over the internal vector derived from the list of tokens. The built-in hash uses a default seed value and scaled ordinal zeroth positional value of the internal state vector, and piecewise computes the bitwise exclusive OR operation while bounding by a scaled bit-mask. Finally, the built-in hash adjusts the size of intermediate vector element using length of internal vector as a bounding variable. Example code for genDefHash( ) is as follows:

```
1.0.    if (InternalVector == []):
1.1.       return 0
2.0.    else:
2.1.       BaseCaseVectorElement = (ord(InternalVector[0]) <<
           LOG2(HASH_BIT_SIZE))
2.2.       Initial Seed = •••••••••••••
2.3.       GenBitMask = ((power(2, HASH_BIT_SIZE)) – 1)
2.4.       for each VectorElement in InternalVector:
2.4.1.        BaseCaseVectorElement = ((BaseCaseVectorElement ×
              InitialSeed) ^ ord(VectorElement)) & GenBitMask)
2.5.       BaseCaseVectorElement ^= length(InternalVector)
2.6.       return (BaseCaseVectorElement)
```

The simhashes generated for the web application are stored in, for example, a queue such as data system queue 110. The change detection processing 112 may access the stored simhashes via the data system queue 110 to compare an earlier version of a web application to the crawled version of the web application.

2.2 Detecting Changes

In operation 206, change detection processing 112 detects meaningful web application changes. The process of detecting web application changes is separate from surfacing the nature of the detected changes in order to facilitate efficient decision making outside of change detection processing 112. Examples of such decision-making include determining whether a certain website path will be crawled or not based on the existence of meaningful web application changes without determining the type of changes. To detect the changes, change detection processing 112 uses similarity hashing based approach. The standard operating behavior of a traditional hash algorithm is to have large output perturbations for small input perturbations. Such a behavior is the manifestation of the Avalanche Effect. Counterintuitively, a similarity hashing algorithm has small output perturbations for small input perturbations. From the field of approximating algorithms, a locality sensitive hashing scheme having the following property is used:

$$\Pr_{h \in F}[h(x)=h(y)]=\text{sim}(x,y)$$

The above property means that given a selected hash algorithm h from a family of similarity hash algorithms F, the probability of having the hashes for the two web application versions x and y to be same can be estimated through a similarity function sim(.,.) over those two comparable web application versions. In these functions, the use of "(.,.)" notation conveys that the function is a binary operation without specifying the nature of operands. Since, the range of both probability space and similarity function is defined over the interval [0, 1] and semantically they both mean the same, they can be equated to each other in a strict mathematical sense.

Two constructions satisfy the requirements for being a similarity function. Both of these constructions rely on the underlying property of min-wise independent permutations, which comes in two variations of set and bit based. The set based similarity function is defined below.

$$sim(x, y) = \frac{|x \cap y|}{|x \cup y|}$$

The more common the two comparable web applications versions (i.e. x and y) are, the more equal their set cardinalities over intersection and union operation would be. Alternatively, if the two versions are quite different then their corresponding set cardinalities over intersection and union operation would be unequal as well. In both scenarios the values would remain in the interval [0, 1]. The bit based similarity function is defined below.

$$sim(x, y) = \frac{\sum_{i=1}^{n} min(x_i, y_i)}{\sum_{i=1}^{n} max(x_i, y_i)}$$

In the bit based similarity function, bitwise min(.,.) and max(.,.) operations are performed over the bit-string representation having positional weightage of two web application versions, x and y, the result is bitwise added, and a ratio of their sums is computed. This is called a ratio of sums metric. This metric enlarges any identical position bit change by adding up the values over the two versions. In particular, the ratio of min(.,.) and max(.,.) sums indicates whether two versions are similar or not by determining whether the sums over min(.,.) and max(.,.) are very similar or not. Thus, if the two versions are different then their corresponding sums would be different as well.

In both scenarios the values of ratio lie in the interval [0, 1] with values approaching zero and one signifying that the two versions are dissimilar and similar, respectively. While the above ratio directly uses the two versions, x and y, to derive the sums, it is possible to compute them based on select transformation of the two versions. For example, a separate similarity hash could be computed for each version before computing the sums. Another useful metric, called hamming distance metric, is based on computing the hamming distance between the two hashes to determine if they are within or beyond a certain threshold. Such a construction is given below.

$$HammingDistance(h(x), h(y)) = D \text{ s.t.} \begin{cases} x \approx y \text{ if } D \leq n \text{ bits} \\ x \neq y \text{ if } D > n \text{ bits} \end{cases}$$

where the following symbols have the following meanings:

Pr[.]: Probability function;

h(.): A locality sensitive hash function;

x, y: Comparable web application versions;

n: The threshold of bit-difference between h(x) and h(y);

F: Family of locality sensitive hash functions;

sim(.,.): A similarity function defined on the comparable web application versions x and y with range in the interval [0, 1];

min(.,.): A minimum function defined on the comparable web application versions x and y;

max(.,.): A maximum function defined on the comparable web application versions x and y;

HammingDistance(.,.): A hamming distance function defined over the h(▢, ▢) function which in turn is defined over the comparable web application versions x and y.

The above threshold of bit-difference (i.e. n) is less than or equal to six bits for 128-bit similarity hashes. This bit-difference is computed and interpreted strictly in the Hamming distance sense. That is if the hamming distance between the similarity hashes of two comparable web application versions, x and y, is greater than n, (i.e. six bits of 128-bit similarity hashes) then the comparable web applications are too different otherwise they are similar. If the two versions are expressed through source code in HTML language, then the above metric is called HTML distance. The bit-difference based threshold is equivalent to saying that if two comparable web applications have 95% or greater bit similarity then they are similar otherwise they have too many differences to warrant closer observation and further evaluation. While considering meaningful change between the two comparable web applications, it often makes sense to use ratio of sums and hamming distance metrics in a logical OR operation fashion. That is if either of the metric registers that two versions are similar then they must be similar and if both the metrics suggest that the two versions are different then they must be different.

The algorithmic description for computing the Hamming distance-based metric 114 is given below:

```
1.0. CountBits = 0
1.1. XORStoredAndInputSimhash = ((Simhash1 ^ Simhash2) &
     ((1 << HASH_BIT_SIZE) - 1))
2.0. while XORStoredAndInputSimhash:
2.1.   XORStoredAndInputSimhash &= (XORStoredAndInputSimhash - 1)
2.2.   CountBits += 1
3.0. return (CountBits)
```

In the above procedure, getHamDist( ), two similarity hashes generated from the comparable versions of the web application's input token lists are used. Subsequently, mutually exclusive OR operation is performed over them, followed by counting of set bits to determine their bit-difference.

The algorithmic description for computing the Ratio of Sums-based metric is given below.

```
1.0. LoopBitLength = (max(Simhash1.Length, Simhash2.Length))
1.1. for each index I in range(0, LoopBitLength):
2.0.  BitVector1.Append((LoopBitLength - I - 1), ((Simhash1 >>
      (LoopBitLength - I - 1)) & 0x1))
2.1.  BitVector2.Append((LoopBitLength - I - 1), ((Simhash2 >> )
      (LoopBitLength - I - 1)) & 0x1)
2.2.  MinVector.Append((LoopBitLength - I - 1), (min(BitVector1[I][1], BitVector2[I][1])))
2.3.  MaxVector.Append((LoopBitLength - I - 1), (max(BitVector1[I][1], BitVector2[I]
[1])))
2.4.  MinSim += MinVector[I][1]
2.5.  MaxSum += MaxVector[I][1]
2.6. return(MinSum / MaxSum)
```

The aforementioned procedure getRatioOfSums( ) takes two similarity hashes as input generated from the input token lists of comparable web applications and compute piecewise min(.,.) and max(.,.) operations before bitwise adding them. Finally, a ratio of min(.,.) and max(.,.) sums is computed.

Post detection of significant change, in an operation 208, change detection processing 112 identify its nature and scope in operation 210. From algorithmic standpoint, to identify the nature and scope of change requires piecewise isolation of the part of artifact that differs between the two versions of the web application. This piecewise isolation process, which mimics the source code difference computing over the two comparable web applications, is illustrated below.

| Example Web Application Source Code Artifact 1 | Example Web Application Source Code Artifact 2 |
|---|---|
| 00 <script type = "text/javascript"> | 00 <script type = "text/javascript"> |
| 01 window.Chorus = window.Chorus \|\| { }; | 01 window.Chorus = window.Chorus \|\| { }; |
| 02 window.Chorus.Context = { | 02 window.Chorus.Context = { |
| 03 logged_in : false, | 03 logged_in : false, |
| 04 user_id: 0, | 04 user_id: 0, |
| 05 network_domain: "google.com", | 05 network_domain: "google.com", |
| 06 emc_admin: false, | 06 emc_admin: false, |
| 07 community_is_primary: true, | 07 }; |
| 08 page_type: "FrontPage", | 08 </script> |
| 09 environment: "production", | |
| 10 hub_id: 270, | |
| 11 current_env: "production", | |
| 12 network_slug: "google", | |
| 13 rack_prefix: "t1.", | |
| 14 }; | |
| 15 </script> | |

In the above illustration, color may be used to signify similarities and differences between the two versions of the web application source code artifacts, respectively. These similarities and differences are derived through standard source code difference computing techniques, which help isolate the nature and scope of detected change.

2.3 Evaluating Changes

Figure 3:
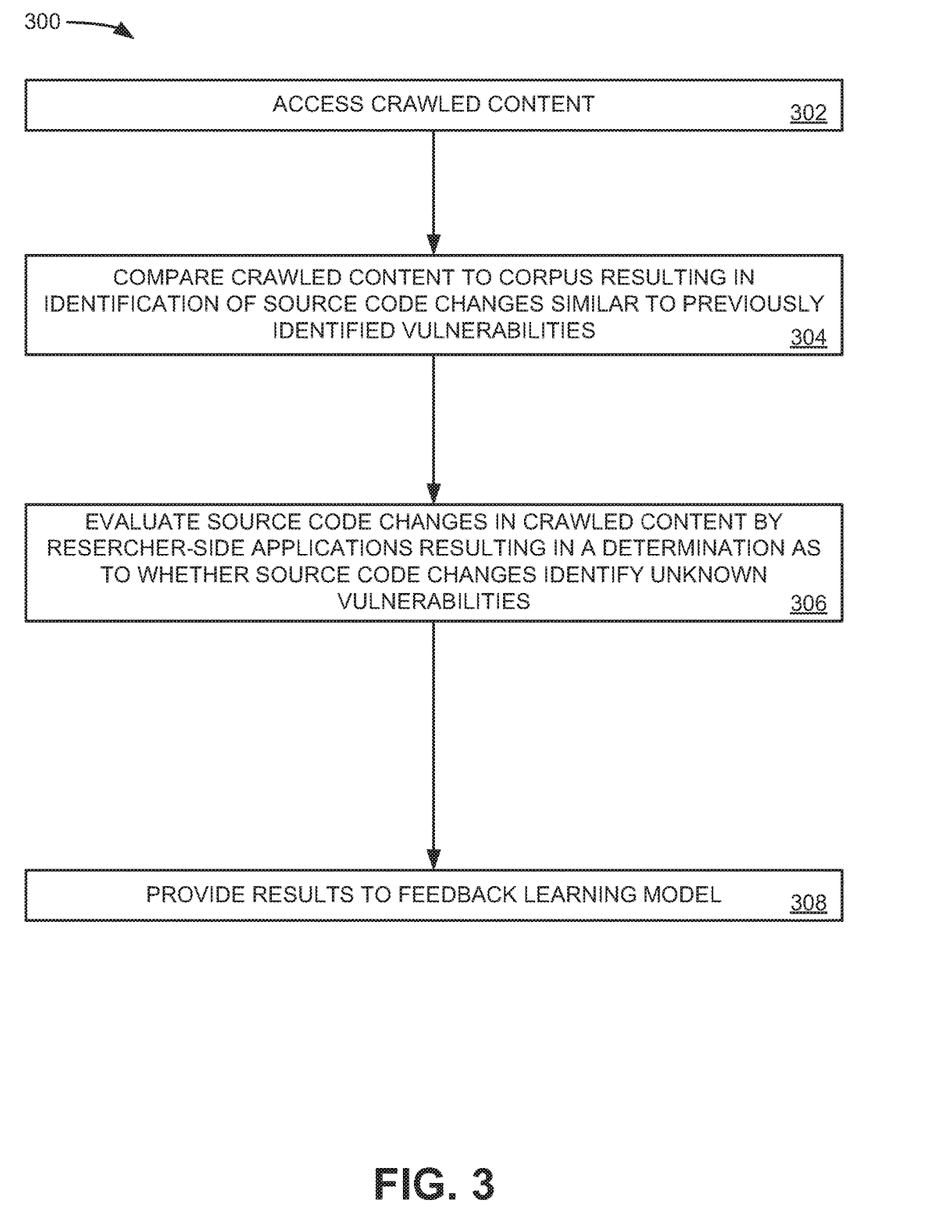
FIG. 3 is a flowchart for using detected changes to modify crawling behavior, according to various embodiments.

Once the change is detected in operation 208 and identified in operation 210, the change is provided as input into a learning model that is part of learning model algorithm 120 in operation 212. Execution of learning algorithm 120 results in a modification to the frequency or scope of the FIG. 3 is a flowchart for using detected changes to modify crawling behavior, according to various embodiments.

In an operation 302, learning model algorithm 120 accesses the crawled content or the corresponding simhashes. Learning model algorithm accesses the crawled content where changes have been detected in operation 208. The detection of changes may cause the crawled content to be added to a queue from which the learning model algorithm 120 accesses the crawled content.

In an operation 304, the learning model algorithm 120 may operate independently, or mutually exclusively, at two different levels: 1) source code level and 2) bit-difference level. These two levels of inferring changes are described below.

At the source code level, learning model algorithm 120 compares the crawled content to a corpus of known attack vectors, attack surfaces, and accepted vulnerabilities. Attack vectors, their targeted attack surfaces, and ensuing accepted vulnerabilities may be gleaned through Launch Point (or LP) session datasets and vulnerabilities database-based joined corpus. Such a corpus, which may be persistent or in-memory in nature, may be correlated with the crawls made by crawling infrastructure on the matching URLs, to show similar source code artifacts. Here, the two source code artifacts are considered similar if their reduced alternate representations (e.g. context-free grammars, language graph models, abstract syntax trees, or ontological descriptions) have similar similarity hashes.

The learning model algorithm 120 acquires reduced alternate representations of source code artifacts that may potentially have latent vulnerabilities, and, through comparison, classify source code artifacts from a larger dataset. Such a comparison accounts for syntactic and semantic variations in the source code artifacts to help improve the overall change quality. Post-identification of such similar changes, intra-listing source code artifacts may or may not be filtered out to surface changes from different listings or surface changes that may be present elsewhere within that listing, respectively.

In operation 306, post-consumption of source code change artifacts by the researcher-side applications, it is determined whether those changes led to discovery of more vulnerabilities. The researcher-side applications are applications executed by a researcher computer 124 associated with a human researcher. The researcher computer 124 presents the source code artifacts to the human researcher who determines whether the change is a new vulnerability.

In operation 308, in response to input received from the researcher computer 124, the learning model algorithm 120 uses the input to modify crawling behavior. In the event that the changes are new vulnerabilities then reduced alternate representations of such source code artifacts and their derivative changes are added to the corpus to surface similar source code artifacts within that listing and across different listings. However, if the changes are not new vulnerabilities, then the learning model algorithm 120 should penalize such instances by not selecting them in the subsequent iterations. Thus, both determinations may be fed back to the learning model algorithm 120.

At the bit-difference level, the notion of similar source code artifacts is from the perspective of measuring the bit-difference between the similarity hashes computed over two versions of the comparable source code artifacts. Thus, within this context, all versions of comparable source code artifacts are surfaced that pass the variable preset bit-difference threshold. If the set value of bit-difference threshold leads to the discovery of more vulnerabilities then that threshold is not altered otherwise it is increased or decreased depending upon the number of researchers that have looked at the surfaced changes, time elapsed, and vulnerabilities discovered. In this case, the learning model algorithm 120 learns the bit-difference threshold values instead of alternate representations of source code artifacts. It is noteworthy here that the bit-difference threshold may be piecewise applied to different datatypes such as embedded JavaScript, external JavaScript, form, and DOM structure. A varying set of piecewise rules may be applied to change bit-difference threshold levels based on source code artifacts. The overall structure in this feedback mechanism remains similar to the one illustrated in the FIG. 3, the only change being different expectations lead to different objects being learned by the learning model algorithm 120. Notably, if the change is significant, the learning model algorithm 120 shows more source code artifacts of already set bit-difference threshold. If the change is not significant, the learning model algorithm 120 shows source code artifacts at different bit-difference thresholds as determined by number of researchers that have seen the changes surfaced, amount of time elapsed since this surfacing event, and number of vulnerabilities found.

3.0 User Interfaces for Presenting Change Data

Figure 4:
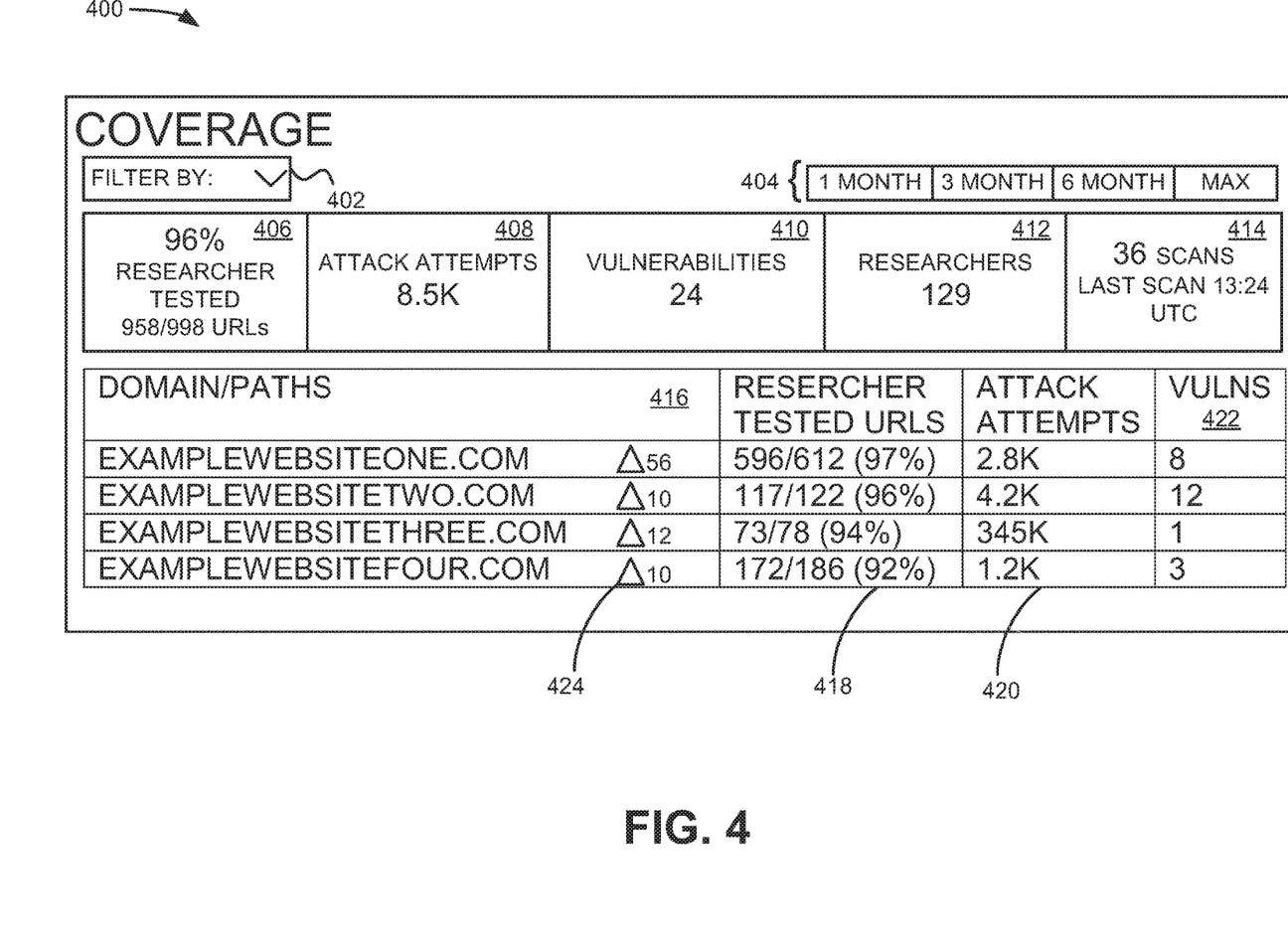
FIG. 4 is a portion of an example user interface displaying information about changes made to a plurality of webpages associated with domains according to various embodiments.

FIG. 4 is a portion of an example user interface 400 generated by client computer 126 and displaying information about changes made to a plurality of webpages associated with domains according to various embodiments. User interface 400 is a dashboard depicting tasks performed. The dashboard can be filtered using filter menu 402. A duration of data to be analyzed can be selected using options 404. Element 406 depicts a percentage and ratio of URLs tested by a researcher computer 124 over the total number of URLs crawled. Element 408 includes a count of detected attempted attacks. Element 410 includes a count of detected vulnerabilities. Element 414 shows a count of available researcher computers 124 to evaluate source code artifacts at a source code level. Element 414 is a count of scan objects in seed queue 102 and includes a time at which a previous scan object was retrieved from the seed queue 102.

The user interface 400 includes a table having a column 416 listing the domains or paths that are associated with the web crawling infrastructure 100. The column 416, along the right border, further includes a triangle symbol, representing the Greek letter, delta (Δ) 424, and a number immediately adjacent. The number denotes a number of changes detected within the domain from previous crawls over the duration selected in options 404. A second column 418 lists, for each domain, a ratio of researcher tested URLs to a total number of URLs associated with the domain over the duration selected in options 404. The researcher tested URLs include those that were evaluated in operation 306. A third column 420 includes an approximate count of detected attack attempts at each of the domains over the duration selected in options 404. A fourth column 422 includes a count of detected vulnerabilities at each of the domains over the duration selected in options 404.

Figure 5:
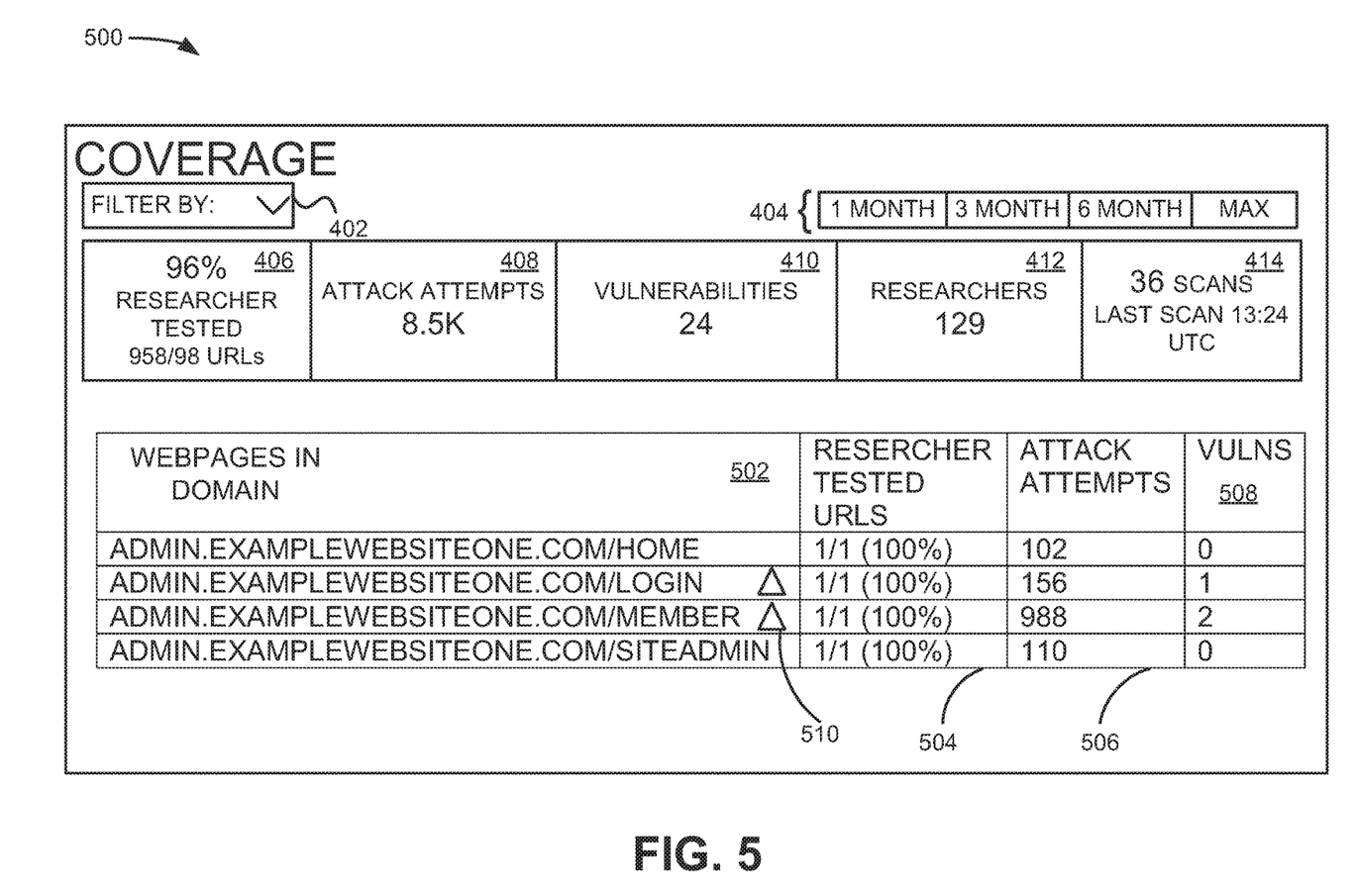
FIG. 5 is a portion of an example user interface displaying information about changes made to webpages within a particular domain, according to various embodiments.

FIG. 5 is a portion of an example user interface 500 generated by client computer 126 and displaying information about changes made to webpages within a particular domain, according to various embodiments. Like user interface 400, user interface 500 is a dashboard depicting tasks performed. The dashboard can be filtered using filter menu 402. A duration of data to be analyzed can be selected using options 404. Element 406 depicts a percentage and ratio of URLs tested by a researcher computer 124 over the total number of URLs crawled. Element 408 includes a count of detected attempted attacks. Element 410 includes a count of detected vulnerabilities. Element 414 shows a count of available researcher computers 124 to evaluate source code artifacts at a source code level. Element 414 is a count of scan objects in seed queue 102 and includes a time at which a previous scan object was retrieved from the seed queue 102.

The user interface 500 includes a table having a column 502 listing the webpages in a domain "admin.examplewebsiteone.com" that are associated with the web crawling infrastructure 100. The column 502, along the right border, further includes a triangle symbol, representing the Greek letter, delta (Δ) 424, indicating whether changes have been detected on the webpage over the duration selected in options 404. A second column 504 lists, for each webpage, a ratio of researcher tested URLs to a total number of URLs associated with the webpage over the duration selected in options 404. The researcher tested URLs include those that were evaluated in operation 306. A third column 506 includes an approximate count of detected attack attempts at each of the webpages over the duration selected in options 404. A fourth column 508 includes a count of detected vulnerabilities at each of the webpages over the duration selected in options 404.

Implementation Example—Hardware Overview

According to one embodiment, the techniques described herein are implemented by one or more special-purpose computing devices. The special-purpose computing devices may be hardwired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
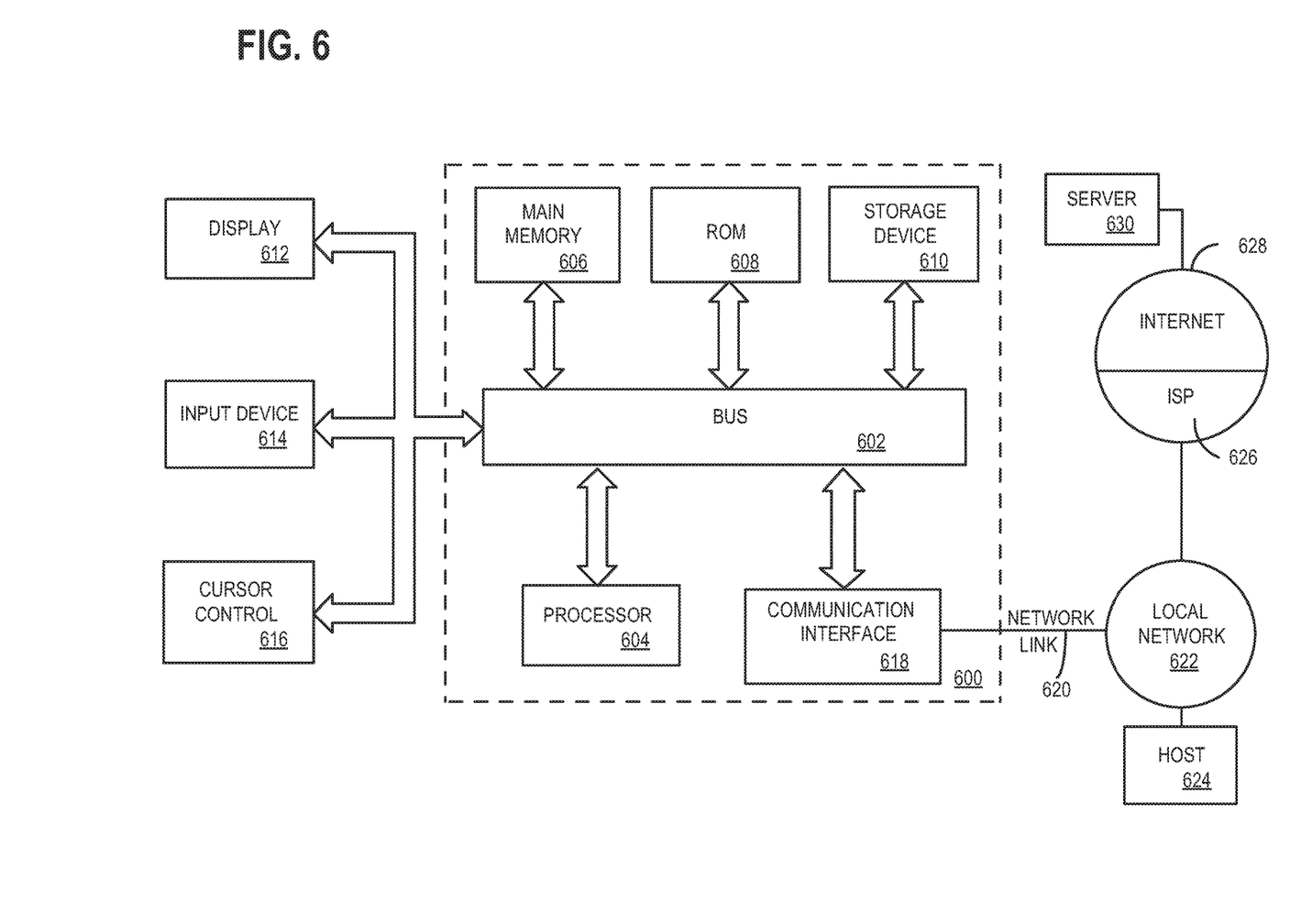
FIG. 6 illustrates an example computer system with which an embodiment may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infrared data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infra-red detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method providing an improvement in detection of changes to a webpage comprising:
    using a crawler, obtaining a first version of a webpage at a first time and a second version of the webpage at a second time, wherein the first version of the webpage has a same Uniform Resource Locator (URL) as the second version of the webpage;
    generating a first simhash of the first version of the webpage and a second simhash of the second version of the webpage;
    calculating, from the first simhash and the second simhash using a locality sensitive similarity hashing function having small output perturbations for small input perturbations, and based on calculating a ratio of sums metric, a probability that there are no differences between the first version of the webpage and the second version of the webpage, the locality sensitive similarity hashing function having a property:

$Pr_{h \in F}[h(x)=h(y)]=sim(x,y)$ based on the probability, providing, to one or more researcher computers, the first version of the webpage and the second version of the webpage;
    based on input identifying a change in the webpage received from the one or more researcher computers, updating a count of changes associated with the webpage;
    providing information about the change in the webpage identified in the second version of the webpage relative to the first version of the webpage as feedback to the crawler using a machine learning model to edify behavior of the crawler.

2. The method of claim 1, further comprising providing information about an identified vulnerability associated with the change in the webpage identified in the second version of the webpage relative to the first version of the webpage as feedback to the crawler.

3. The method of claim 1, wherein the feedback being based on differences at a bit and source code level, the feedback comprising an indication that the change is associated with a security vulnerability, and the feedback causing the crawler to crawl the webpage more frequently.

4. The method of claim 1, wherein the feedback being based on differences at a bit and source code level, the feedback comprising an indication that the change is not associated with a security vulnerability, and the feedback causing the crawler to crawl the webpage less frequently.

5. The method in claim 1, wherein the feedback being based on differences at a bit and source code level, and the method further comprises:
    using the feedback, tracking variable change thresholds;
    using the feedback, managing the variable change thresholds;
    using the feedback, enforcing the variable change thresholds.

6. The method of claim 1, wherein the first simhash of the first version of the webpage and the second simhash of the second version of the webpage are generated from a first Document Object Model (DOM) of the first version of the webpage and a second DOM of the second version of the web page, both of which are modeled as tree data structure, and wherein the change is located in the second DOM.

7. The method of claim 1, wherein the first simhash of the first version of the webpage and the second simhash of the second version of the webpage are generated from a first embedded JavaScript source code of the first version of the webpage and a second embedded JavaScript source code of the second version of the webpage, and wherein the change is located in the second embedded JavaScript source code.

8. The method of claim 1, wherein the first simhash of the first version of the webpage and the second simhash of the second version of the webpage are generated from a first external JavaScript source code of the first version of the webpage and a second external JavaScript source code of the second version of the webpage, and wherein the change is located in the second external JavaScript source code.

9. The method of claim 1, wherein the webpage comprises a form having attributes, wherein the first simhash of the first version of the webpage is generated from the form of the first version of the webpage and a attribute-level source code associated with the form of the first version of the webpage, wherein the second simhash of the second version of the webpage is generated from the form of the second version of the webpage and a attribute-level source code associated with the form of the second version of the webpage.

10. The method of claim 1, wherein the locality sensitive similarity hashing function is part of a pluggable architecture comprising a plurality of pluggable metrics, each of the plurality of pluggable metrics being associated with detecting changes within a particular data type.

11. The method of claim 10, wherein the plurality of pluggable metrics is arranged in a hierarchical manner and used to determine a variable change threshold associated with the webpage.

12. The method of claim 11, wherein the particular data type is raw HTML, HTML DOM elements, aggregate of HTML element "style" attribute values, aggregate of text content wrapped in "<script>" tags, each value held by HTML element "data" attributes, aggregate of text content wrapped in "<form>" tags, embedded JavaScript source code or external JavaScript source code.

13. The method of claim 1, further comprising measuring a bit-difference between the first simhash of the first version of the webpage and a second simhash of the second version of the webpage.

14. The method of claim 1, further comprising measuring a bit-difference between the first simhash and second simhash computed at least over different versions of source code artifacts comparable to at least the first version of the webpage and the second version of the webpage to result in surfacing versions of comparable source code artifacts that pass a variable preset bit-different threshold, the variable preset bit-difference threshold being increased or decreased depending upon time elapsed and vulnerabilities discovered between the different versions.

15. An improved crawler for detection of changes in a webpage comprising:
    one or more processors;
    a non-transitory computer-readable medium having instructions embodied thereon that, when executed by the one or more processors, cause performance of:
    obtaining a first version of a webpage at a first time and a second version of the webpage at a second time, wherein the first version of the webpage has a same Uniform Resource Locator (URL) as the second version of the webpage;

generating a first simhash of the first version of the webpage and a second simhash of the second version of the webpage;

calculating, from the first simhash and the second simhash using a locality sensitive similarity hashing function having small output perturbations for small input perturbations, and based on calculating a ratio of sums metric, a probability that there are no differences between the first version of the webpage and the second version of the webpage, the locality sensitive similarity hashing function having a property:

$$Pr_{h \in F}[h(x)=h(y)]=\text{sim}(x,y)$$

based on the probability, providing, to one or more researcher computers, the first version of the webpage and the second version of the webpage;

based on input identifying a change in the webpage received from the one or more researcher computers, updating a count of changes associated with the webpage;

providing information about the change in the webpage identified in the second version of the webpage relative to the first version of the webpage as feedback to the improved crawler using a machine learning model to modify behavior of the improved crawler.

16. The improved crawler of claim 15, wherein the instructions, when executed, further cause providing information about an identified vulnerability associated with the change in the webpage identified in the second version of the webpage relative to the first version of the webpage as feedback to the improved crawler.

17. The improved crawler of claim 15, wherein the feedback being based on differences at a bit and source code level, the feedback comprising an indication that the change is associated with a security vulnerability, and the feedback causing the improved crawler to crawl the webpage more frequently.

18. The improved crawler of claim 15, wherein the feedback being based on differences at a bit and source code level, the feedback comprising an indication that the change is not associated with a security vulnerability, and the feedback causing the improved crawler to crawl the webpage less frequently.

19. The improved crawler of claim 15, wherein the feedback being based on differences at a bit and source code level, and the instructions further cause:

using the feedback, tracking variable change thresholds;

using the feedback, managing the variable change thresholds;

using the feedback, enforcing the variable change thresholds.

20. The improved crawler of claim 15, wherein the first simhash of the first version of the webpage and the second simhash of the second version of the webpage are generated from a first Document Object Model (DOM) of the first version of the webpage and a second DOM of the second version of the web page, both of which are modeled as tree data structure, and wherein the change is located in the second DOM.

21. The improved crawler of claim 15, wherein the first simhash of the first version of the webpage and the second simhash of the second version of the webpage are generated from a first embedded JavaScript source code of the first version of the webpage and a second embedded JavaScript source code of the second version of the webpage and wherein the change is located in the second embedded JavaScript source code.

22. The improved crawler of claim 15, wherein the first simhash of the first version of the webpage and the second simhash of the second version of the webpage are generated from a first external JavaScript source code of the first version of the webpage and a second external JavaScript source code of the second version of the webpage and wherein the change is located in the second external JavaScript source code.

23. The improved crawler of claim 15, wherein the webpage comprises a form having attributes, wherein the first simhash of the first version of the webpage is generated from the form of the first version of the webpage and a attribute-level source code associated with the form of the first version of the webpage, wherein the second simhash of the second version of the webpage is generated from the form of the second version of the webpage and a attribute-level source code associated with the form of the second version of the webpage.

24. The improved crawler of claim 15, wherein the locality sensitive similarity hashing function is part of a pluggable architecture comprising a plurality of pluggable metrics, each of the plurality of pluggable metrics being associated with detecting changes within a particular data type.

25. The improved crawler of claim 24, wherein the plurality of pluggable metrics is arranged in a hierarchical manner and used to determine a variable change threshold associated with the webpage.

26. The improved crawler of claim 25, wherein the particular data type is raw HTML, HTML DOM elements, aggregate of HTML element "style" attribute values, aggregate of text content wrapped in "<script>" tags, each value held by HTML element "data" attributes, aggregate of text content wrapped in "<form>" tags, embedded JavaScript source code or external JavaScript source code.

27. The improved crawler of claim 15, further comprising measuring a bit-difference between the first simhash of the first version of the webpage and a second simhash of the second version of the webpage.

28. The improved crawler of claim 15, further comprising measuring a bit-difference between the first simhash and second simhash computed at least over different versions of source code artifacts comparable to at least the first version of the webpage and the second version of the webpage to result in surfacing versions of comparable source code artifacts that pass a variable preset bit-different threshold, the variable preset bit-difference threshold being increased or decreased depending upon time elapsed and vulnerabilities discovered between the different versions.

* * * * *